United States Patent [19]

Chandler et al.

[11] Patent Number: 4,988,142
[45] Date of Patent: Jan. 29, 1991

[54] TRANSPARENT UPPER DOOR FRAME

[75] Inventors: Maurice P. Chandler, Utica; Michael S. Fylan, Lakeville, both of Mich.

[73] Assignee: General Motors Corporation, Detroit, Mich.

[21] Appl. No.: 444,641

[22] Filed: Dec. 1, 1989

[51] Int. Cl.⁵ .............................................. B60J 5/00
[52] U.S. Cl. .................................. 296/146; 296/96.12; 296/201; 49/502
[58] Field of Search ...................... 296/146, 201, 96.12; 49/502, 503

[56] References Cited

U.S. PATENT DOCUMENTS

| 3,202,452 | 8/1965 | Wilfert | 296/96.12 X |
| 4,644,699 | 2/1987 | Chandler et al. | 296/146 X |
| 4,648,205 | 3/1987 | Ono | 49/502 X |
| 4,716,682 | 1/1988 | De Rees | 49/502 X |

FOREIGN PATENT DOCUMENTS

| 3313658 | 10/1984 | Fed. Rep. of Germany | 296/201 |
| 1024 | 1/1985 | Japan | 296/146 |

Primary Examiner—Dennis H. Pedder
Assistant Examiner—Andrew C. Pike
Attorney, Agent, or Firm—Charles E. Leahy

[57] ABSTRACT

The vehicle door has a conventional structurally rigid lower portion which movably mounts a transparent window panel for movement between a lowered opened position stored within the lower portion and a raised closed position. The door also has an arcuate shaped transparent window frame having a lower end fixedly mounted on the door lower portion and extending upwardly along the pillar and along the roof to define a structurally rigid upper edge portion of the door closing the spaced between the transparent window panel and the roof and the piller. The stationary transparent window frame is more curved than the movable window panel so that the vehicle body is dramatically curved and provides an aesthetically pleasing vehicle shape. A transparent seal structure is mounted on the transparent window frame and is engaged by the window panel to provide water tight transparent sealing.

6 Claims, 2 Drawing Sheets

TRANSPARENT UPPER DOOR FRAME

The invention relates to a vehicle body construction and more particularly to a door structure having a transparent upper door frame.

BACKGROUND OF THE INVENTION

Motor vehicle bodies include a roof supported by pillars. The pillars and the roof cooperate to define door openings which receive the vehicle doors.

Automobile bodies of modern design feature large expanses of glass and smoothly curved surfaces which cooperate to provide aesthetically pleasing and aerodynamically efficient vehicles.

It is desirable to provide highly curved side window glass which would contribute to the roundness of the vehicle. However, vehicle doors must be relatively thin in cross section in order to maximize the passenger compartment dimensions, and this thinness of the doors limits the ability of the door to receive a highly curved side window glass when the window glass is lowered to the opened position.

Accordingly, it would be desirable to provide a new and improved vehicle door in which the side window curvature would be substantially increased, and yet the window could be raised and lowered within the confines of a relatively thin door.

SUMMARY OF THE INVENTION

According to the present invention, the vehicle door has a conventional structurally rigid lower portion which movably mounts a transparent window panel for movement between a lowered opened position stored within the lower portion and a raised closed position. The door also has an arcuate shaped transparent window frame having a lower end fixedly mounted on the door lower portion and extending upwardly along the pillar and along the roof to define a structurally rigid upper edge portion of the door closing the spaced between the transparent window panel and the roof and the pillar. The stationary transparent window frame is more curved than the movable window panel so that the vehicle body is dramatically curved and provides an aesthetically pleasing vehicle shape. A transparent seal structure is mounted on the transparent window frame and is engaged by the window panel to provide water tight see-through sealing.

Accordingly, the object, feature, and advantage of the invention resides in the provision of a vehicle door construction in which a structurally rigid transparent window frame is carried by the vehicle door and closes out the space between a vertically moveable window and the vehicle roof.

Another feature, object, and advantage of the invention resides in the provision of a transparent seal structure acting between a vertically moveable side door window panel and a transparent structurally rigid window frame of the door to provide water tight see-through sealing.

BRIEF DESCRIPTION OF THE DRAWINGS

These and other features, objects, and advantages of the invention will become apparent upon consideration of the description of the preferred embodiment and appended drawings in which.

DESCRIPTION OF THE PREFERRED EMBODIMENT

Figure 1:
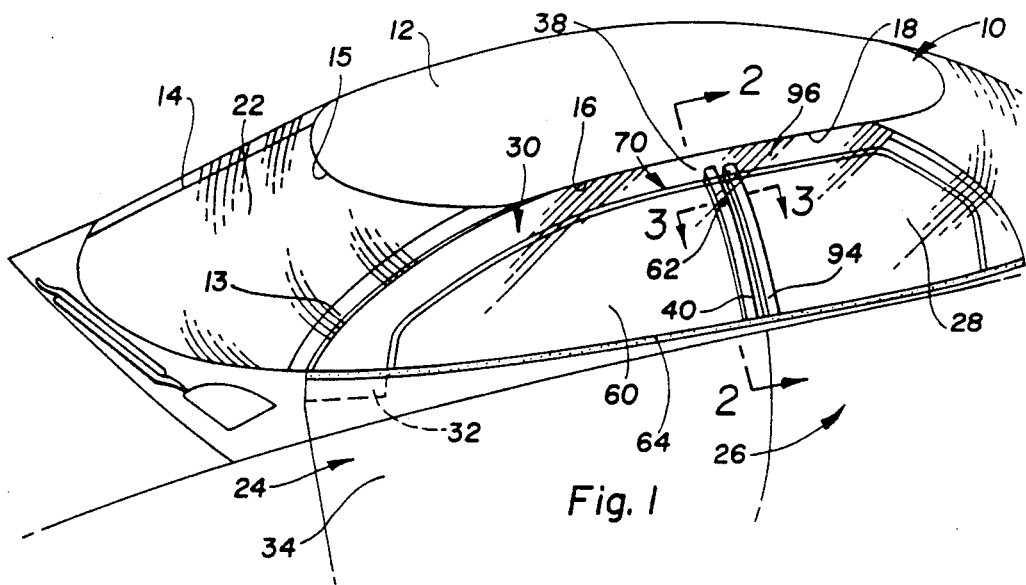
FIG. 1 is a perspective view of a vehicle body according to the invention.

Referring to FIG. 1, it is seen that a vehicle body, generally indicated at 10, includes a roof panel 12 supported by windshield pillars 13 and 14, and defining a windshield opening 15, a front door opening 16, and a rear door opening 18. A windshield panel 22 closes the windshield opening 15 and overlies and conceals the windshield pillars 13 and 14 supporting the roof. A front door 24 is hingedly mounted in the front door opening 16, and a rear door 26 is hingedly mounted in the rear door opening 18.

As seen in FIG. 1, the roof panel 12 has the appearance from outside the car of being entirely supported by the windshield panel 22, the side windows of the front door 24 and rear door 26, and a rear window 28. In addition, as seen in FIG. 1, the vehicle body has a highly rounded aesthetically pleasing appearance.

Figure 2:
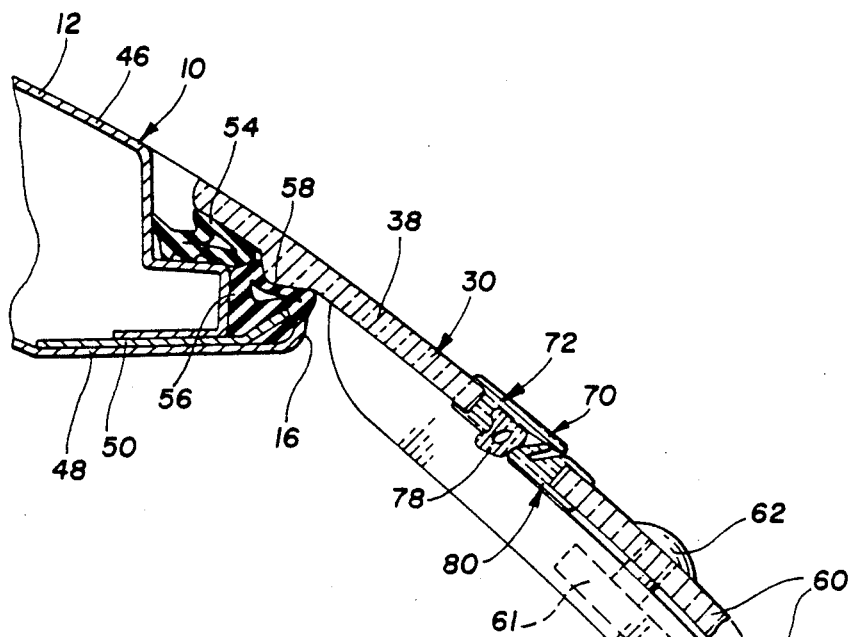
FIG. 2 is a sectional view taken in the direction of arrows 2—2 of FIG. 1.

As best seen in FIGS. 1 and 2, it will be understood that the highly curved and flush contiguous shape of the vehicle is enabled by the front door 24 having a stationary transparent window frame 30 which is comprised of a molded clear polycarbonate material such as the material sold under the tradename LEXAN. As seen in FIG. 1, the transparent window frame 30 has an arcuate shape and includes a forward end 32 which is suitably bolted or bonded onto the structural lower portion 34 of the front door 24. The arcuate shape of the transparent window frame 30 extends upwardly and rearwardly along the windshield 22 and windshield pillar 13 and along the edge of the roof panel 12. As seen in FIG. 2, a rearward end 38 of the transparent window frame 30 is supported on the lower structural portion 34 of the door by a tubular strut 40 which extends vertically along the rear edge of the front door 24 inboard the transparent window frame 30 and the side window of the door. The upper end of the strut 40 is adhesively bonded or bolted to the rear portion 38 of the transparent window frame 30. The lower end of the strut 40 is suitably bonded or fastened to an inner panel 42 of the vehicle door lower structural portion 34.

As best seen in FIG. 2, the vehicle roof 12 includes an outer panel 46 and an inner panel 48 which are suitably welded together with a reinforcement 50 interposed therebetween. The roof panels 46 and 48 define a flange structure adjacent the roof opening 16. A pair of resilient weather strips 54 and 56 are mounted on this flange structure and are sealingly engaged by the transparent window frame 30 when the vehicle door is closed as shown in FIGS. 1 and 2. The molded transparent window frame 30 is generally uniform in thickness but has an integrally molded rib structure 58 which extends along the length of window frame 30 and serves to rigidify the transparent window frame 30 and also to improve the weather tight engagement with the weatherstrips 54 and 56.

Figure 3:
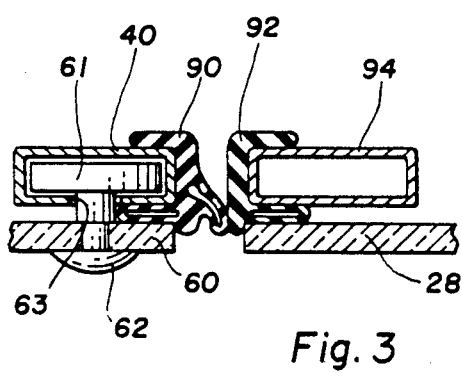
FIG. 3 is a sectional view taken in the direction of arrows 3—3 of FIG. 1.

Referring again to FIG. 2, it is seen that a transparent window panel 60 is provided for closing the space remaining between the transparent window frame 30 and the structural lower portion 34 of the door. The window panel 60 is of conventional glass or plastic material and is mounted on a window regulator mechanism which raises the window panel 60 to the closed position in flush contiguous relationship with the transparent window frame 30 as seen in FIG. 2 and lowers the window panel 60 to an open position. As seen in FIG. 3, the mounting and guiding of the window panel 60 may be facilitated by mounting a suitable slide 61 or roller on the edge of window panel 60 by a rivet 62. The strut 40 has an access slot 63 along the outboard face thereof and the slide 61 rides in the strut 40 to guide the window panel 60. As seen in FIG. 2, the window panel 60 is sealed in relation to the lower structural portion 34 of the door by a flexible belt molding 64 and a weather strip 68.

Figures 4, 5:
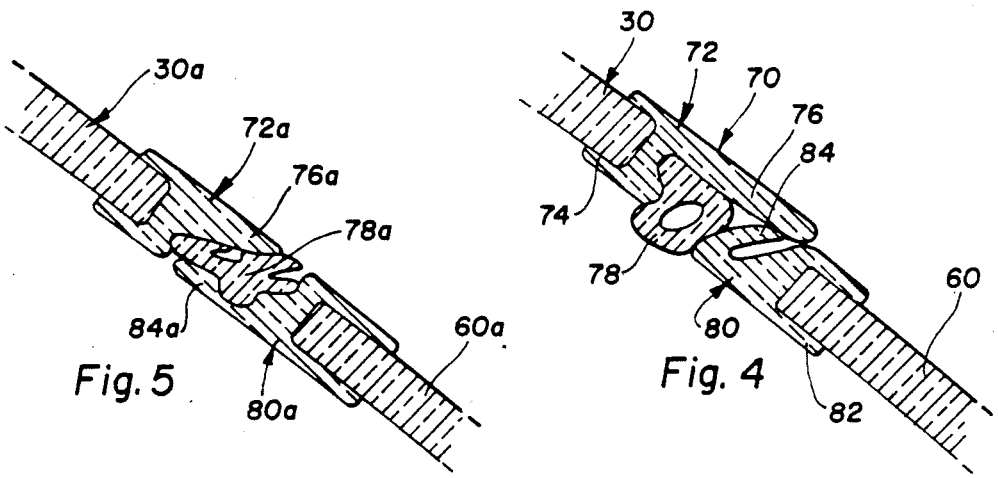
FIG. 4 is an enlarged fragmentary view showing the transparent seal construction acting between the moveable window panel and the transparent window frame.
FIGS. 5, 6 and 7 show alternate transparent seal constructions.

As best seen in FIGS. 2 and 4, a transparent seal structure is provided between the moveable window panel 60 and the stationary transparent window frame 30. The seal structure, generally indicated at 70, includes a relatively rigid upper portion 72 including a channel shaped base 74 which is force-fitted over the edge of the transparent window frame 30 and has an outer leg 76 which reaches towards the moveable window panel 60. A compressible transparent neoprene tubular seal 78 is carried by the upper portion 72. A relatively rigid lower portion 80 includes a channel shaped base 82 which is force-fitted over the edge of the moveable window panel 60 and has a flexible lip portion 84 which yieldably engages against the outer leg 76 of upper portion 72 and also compressibly engages against the neoprene tubular seal 78. The seal portions 72 and 80 are relatively rigid so that the engagement therebetween lends stability to the moveable window panel 60 in the closed position. The transparency of the upper portion 72, the seal 78, and the lower portion 80 causes the window frame 30 and the window panel 60 to appear to be an uninterrupted glass surface, thereby providing an obstructed, transparent, see-through side window construction for the door. The upper portion 72 for retaining the seal 78 may be molded integrally with the window frame 30.

Figures 6, 7:
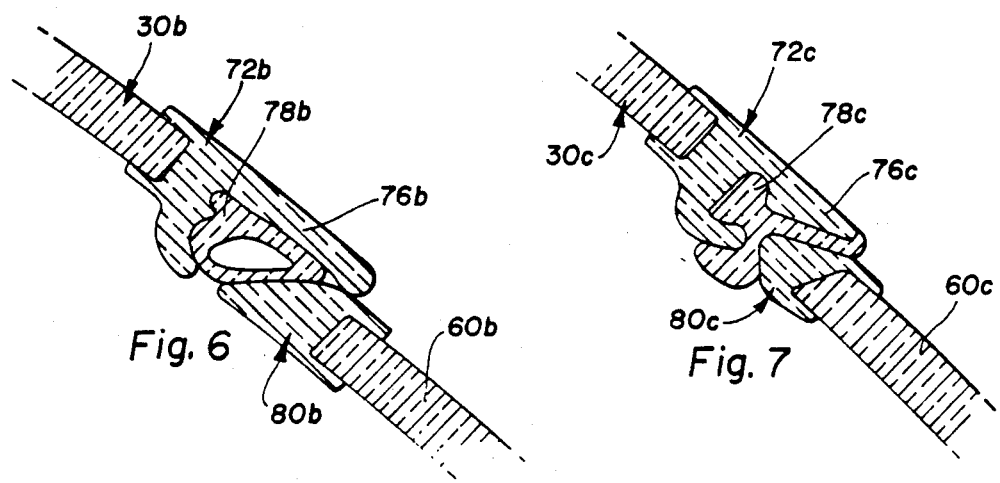

FIGS. 5-7 show alternate constructions for the seal structure acting between the window frame 30 and the movable window panel 60. In FIG. 5 it is seen that the upper seal portion 72a and the lower seal portion 80a respectively have relatively rigid wedge shaped projections 76a and 84a with the tubular seal 78a being mounted on the lower seal portion 80a and compressed between the wedged shaped projections 76a and 84a.

In FIG. 6 the upper portion 72b has a projection 76b which reaches into engagement with the lower portion 80b. The tubular seal 78b is carried by the upper portion 72b and engages with a surface of the lower portion 80b.

In FIG. 7 the upper portion 72c carries the tubular seal 78c and has a wedge shaped projection 76c which compresses the seal 78c against a angled surface on the lower portion 80c.

As best seen in FIG. 3, the space between front door 24 and the rear door 26 is effectively sealed by the engagement between a weatherstrip 90 carried on the rear side of the strut 40 and a weatherstrip 92 carried on the forward side of a strut 94 which supports a transparent frame member 96 of the rear door 26. The movable window panel 96 of the rear door 26 may also have a slide or roller, not shown, engaged in the strut 94 to mount and guide the window panel 96 for up and down movement. Thus, both the front door 24 and the rear door 26 may be constructed in accordance with the invention and have transparent door frame and frame-to-window seal arrangement.

Thus it is seen that the invention provides a vehicle window construction which provides a dramatically rounded vehicle body shape and yet is structurally rigid and effectively water-tight.

The embodiments of the invention in which an exclusive property or privilege is claimed are defined as follows:

1. In a vehicle body having a side door opening and a door hingedly mounted to open and close the door opening, the improvement comprising:

the vehicle door having a movable window panel mounted on the door for movement between a lowered open position and a raised closed position, and a window frame rigidly mounted on the door and defining a fixed upper edge portion of the door, said window frame and said window panel both being constructed of a transparent material.

2. The improvement of claim 1 further characterized by the window frame being constructed of a molded transparent material and having a stiffening rib extended along a length thereof.

3. In a vehicle body having a side door opening and a door hingedly mounted to open and close the door opening, the improvement comprising:

the vehicle door having a movable transparent window panel mounted on the door for movement between a lowered open position and a raised closed position, a transparent window frame panel rigidly mounted on the door and defining at least an upper edge portion of the door, and a transparent seal structure carried by at least one of the panels and effective to provide watertight transparent sealing between said window frame panel and said window panel.

4. In a vehicle body having a side door opening defined by a roof supported by a pillar, and a door hingedly mounted to open and close the door opening, the improvement comprising:

a transparent window frame panel rigidly mounted on the door and extending along the pillar and along the roof to define a structurally rigid upper edge portion of the door, a transparent window panel movable mounted on the door for movement between a lowered open position stored within the door and a raised closed position providing a flush contiguous surface with the window frame panel, and a transparent seal structure carried by at least one of the panels and effective to provide watertight sealing between said window frame panel and said window panel.

5. In a vehicle body having a side door opening defined by a roof supported by a pillar, and a door hingedly mounted to open and close the door opening and having a transparent upper window portion and a structural lower portion, the improvement comprising:

a transparent window panel movably mounted on the door for movement between a lowered open position stored within the door lower portion and a raised closed position defining a space between the window panel and the roof and the pillar, an arcuate shaped transparent window frame panel having a lower end fixedly mounted on the door lower portion and extending along the pillar and along the roof to define a structurally rigid upper edge portion of the door closing the space between the window panel and the roof and the pillar, and a strut extending vertically between the door lower portion and the window frame panel to support the window frame panel.

6. The improvement of claim 5 further characterized by guide means acting between the window panel and the strut to support and guide the window panel during movement between open and closed positions.

* * * * *